Aug. 18, 1953 E. C. PETERSON 2,649,003
MANIPULATING ON MILL TABLES
Filed May 28, 1947 9 Sheets-Sheet 3
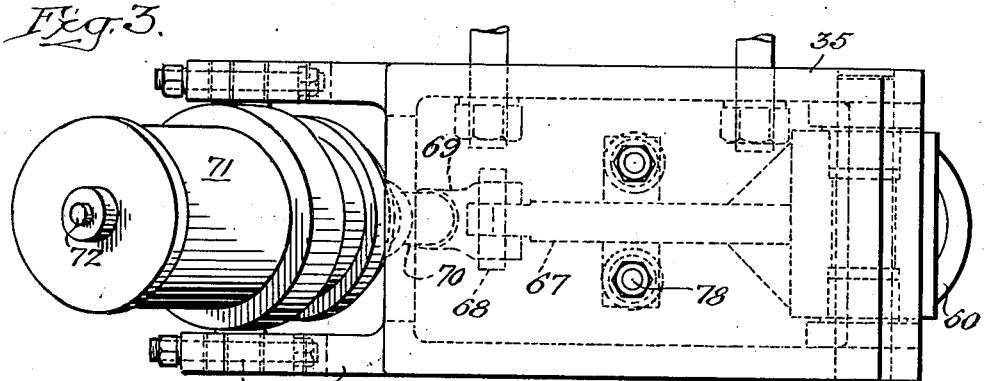
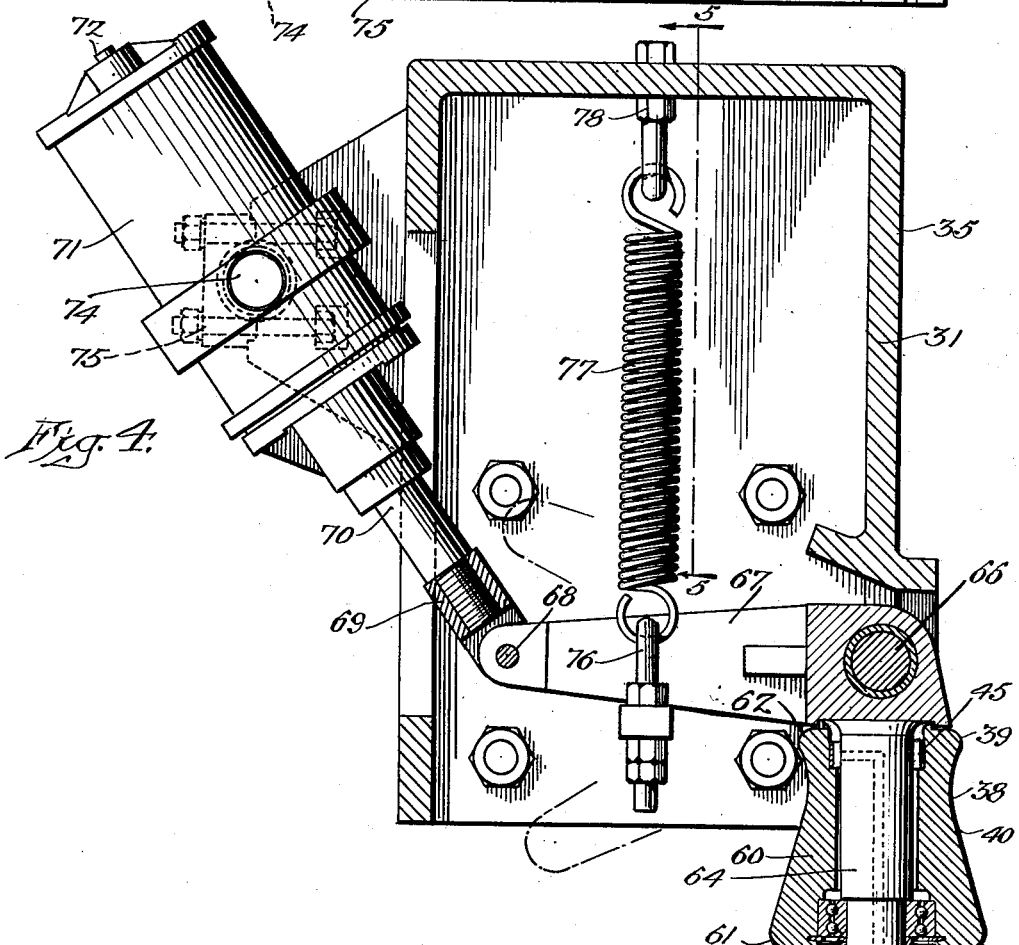
INVENTOR
Edward C. Peterson
BY
ATTORNEY Aug. 18, 1953     E. C. PETERSON     2,649,003
MANIPULATING ON MILL TABLES
Filed May 28, 1947                       9 Sheets-Sheet 4
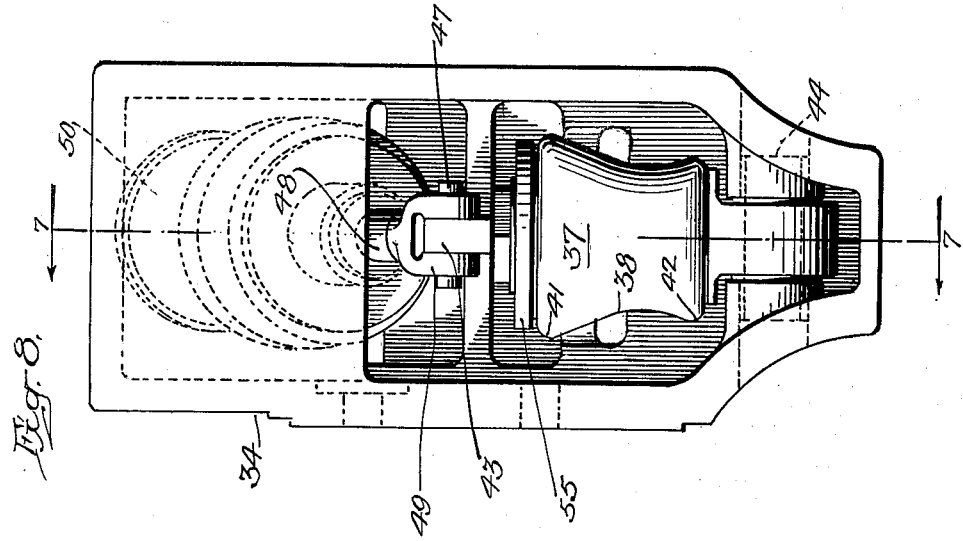
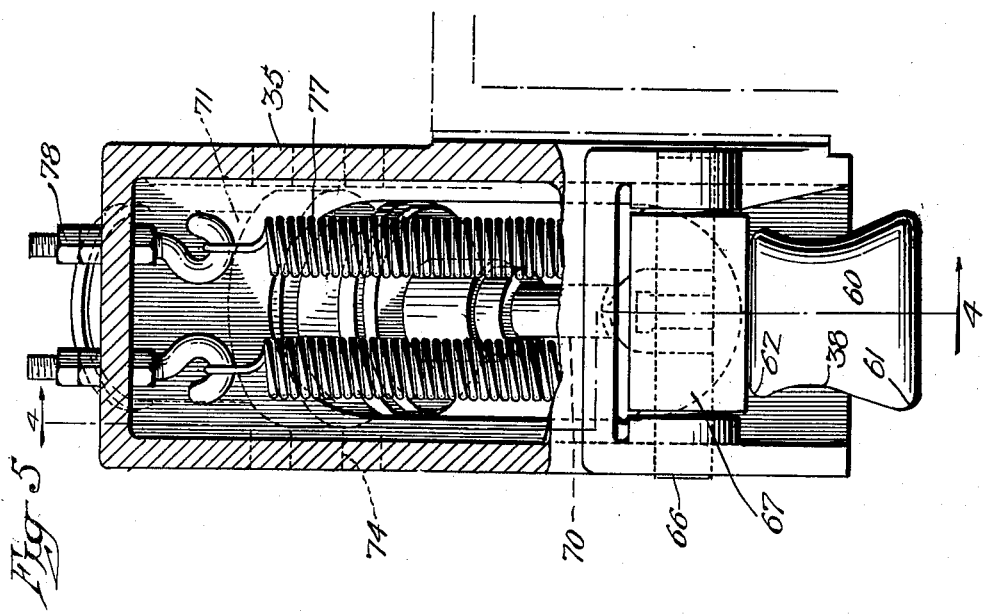
INVENTOR
Edward C. Peterson.
BY
ATTORNEYS.

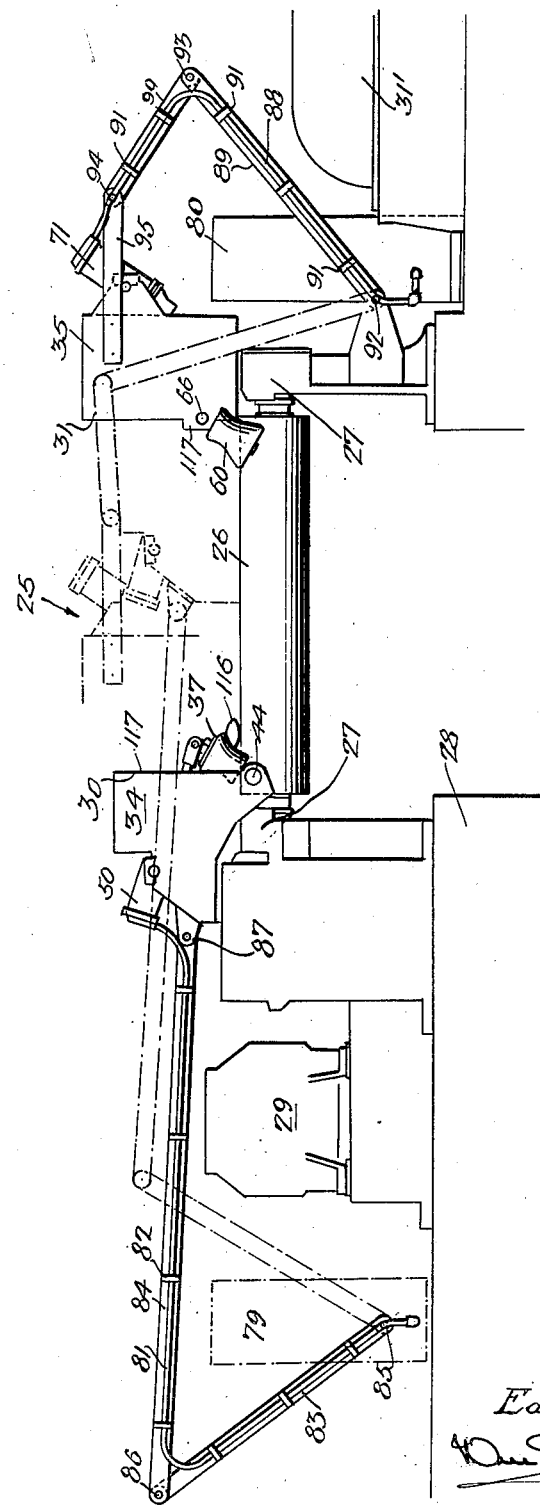

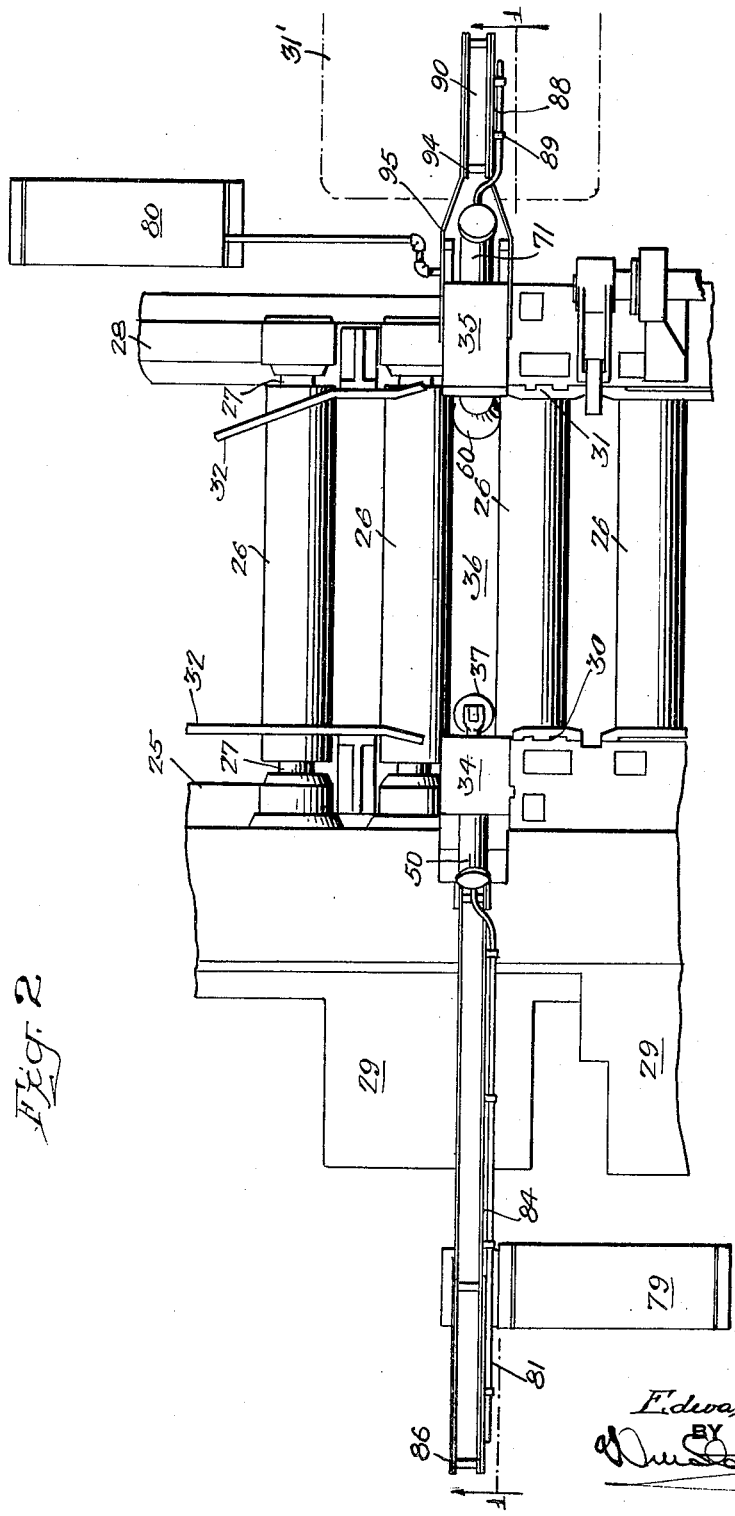

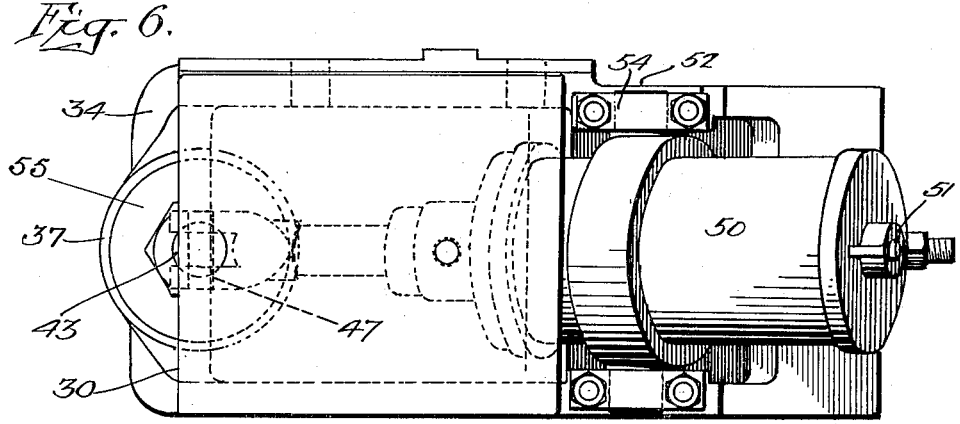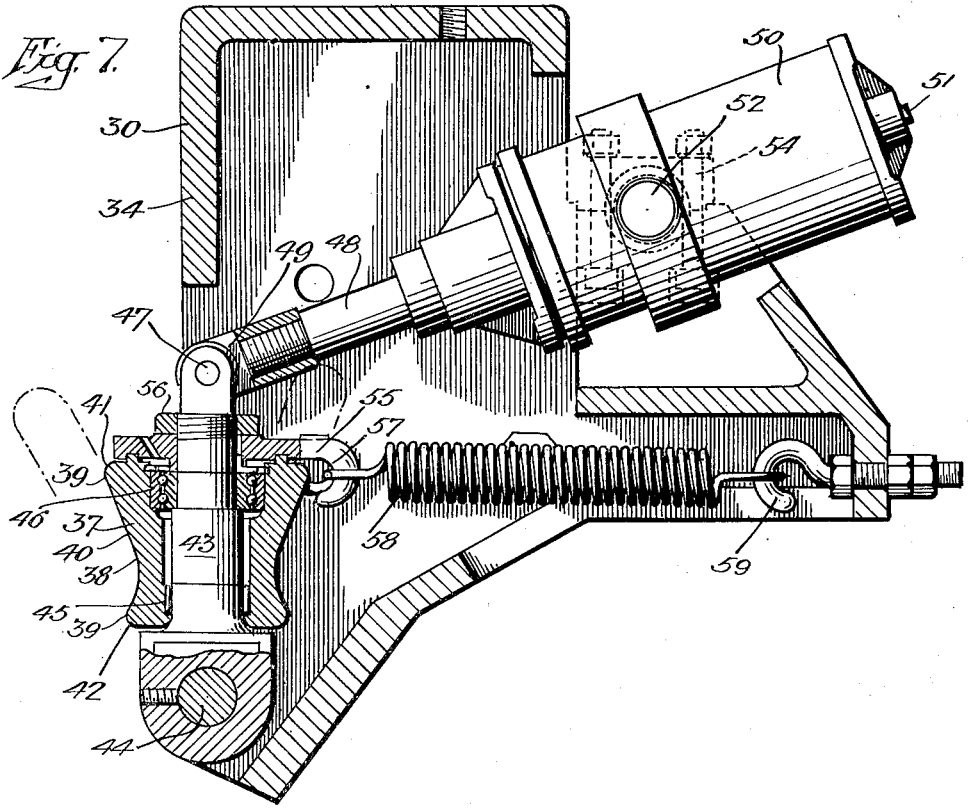

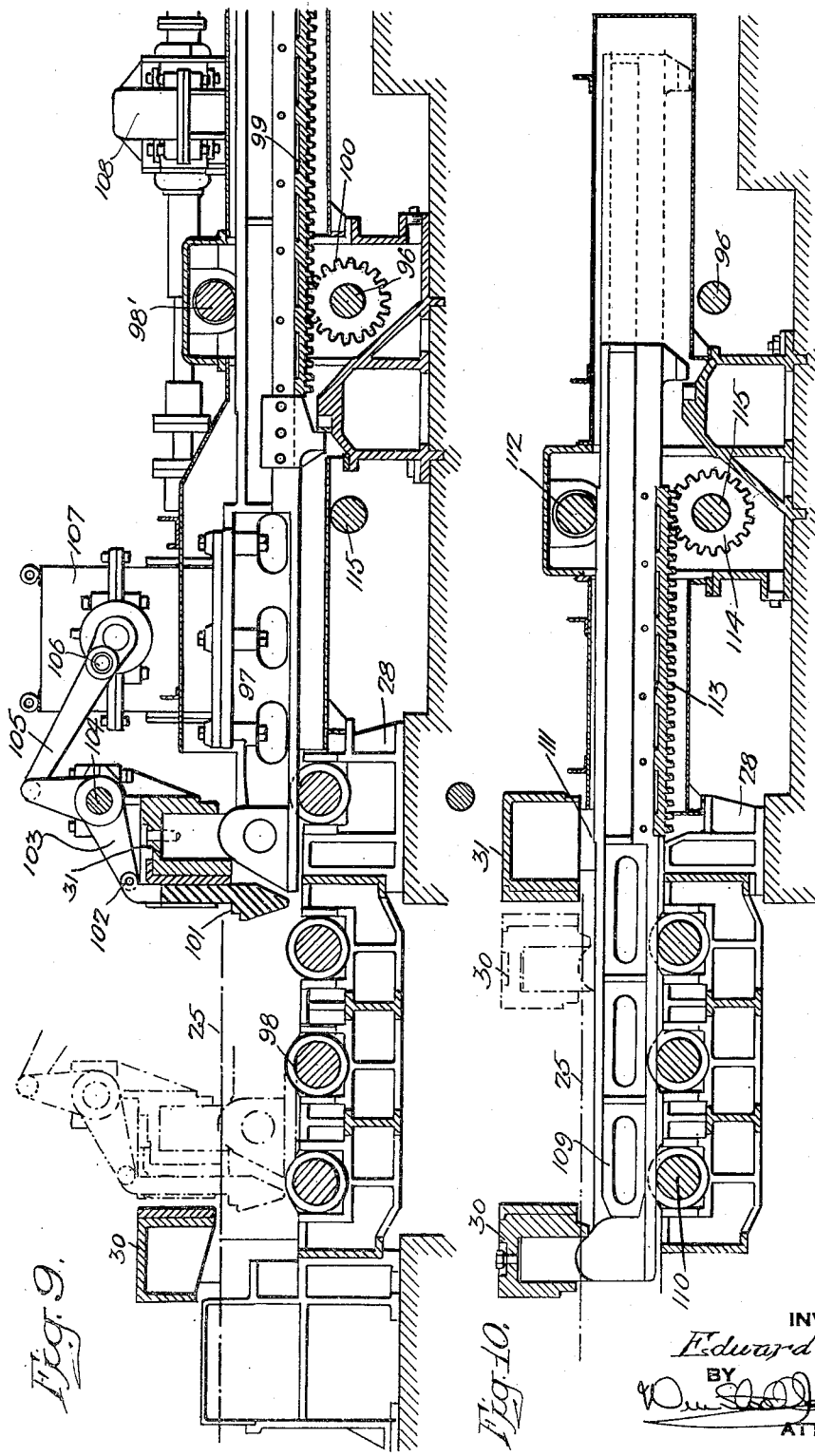

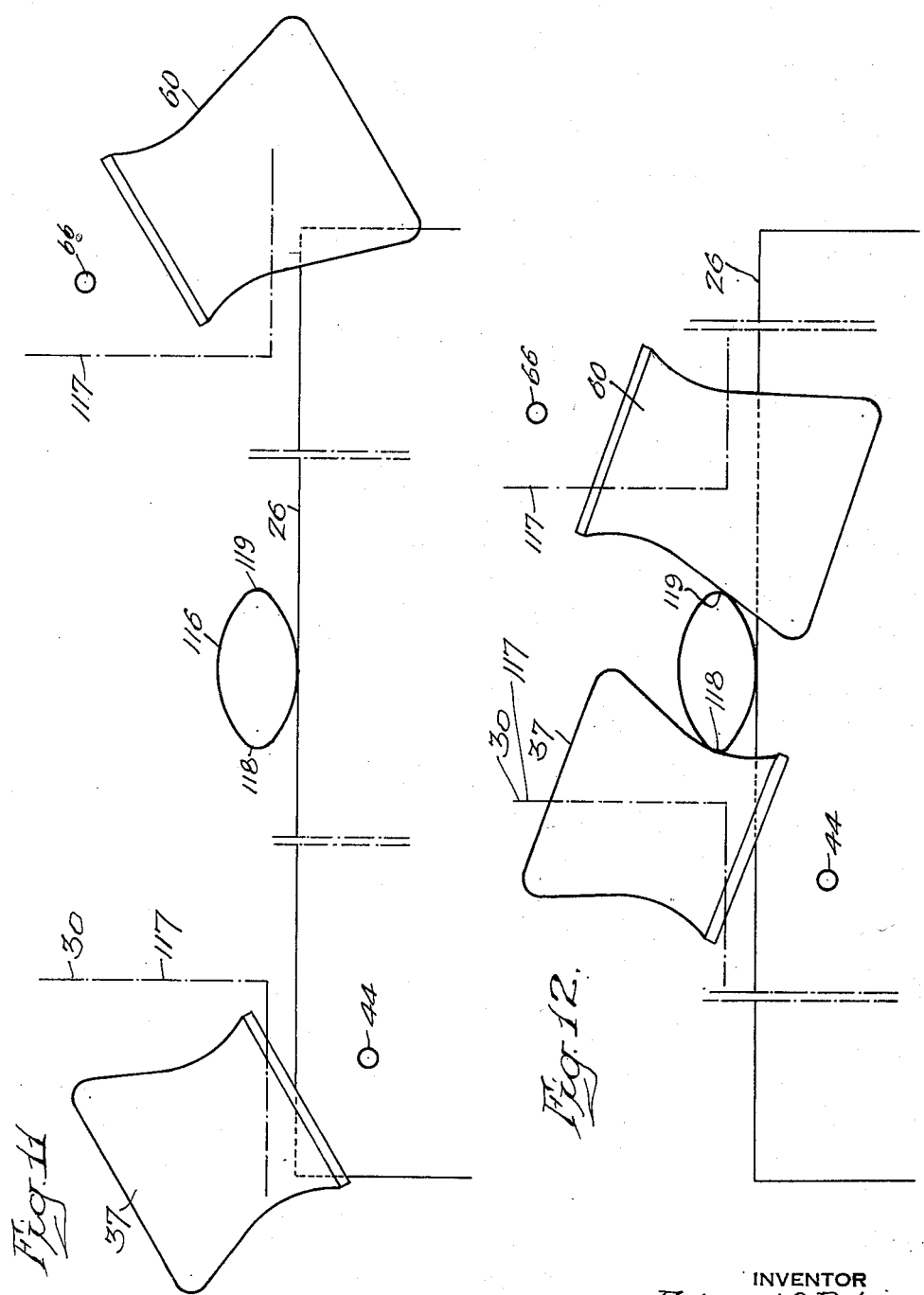

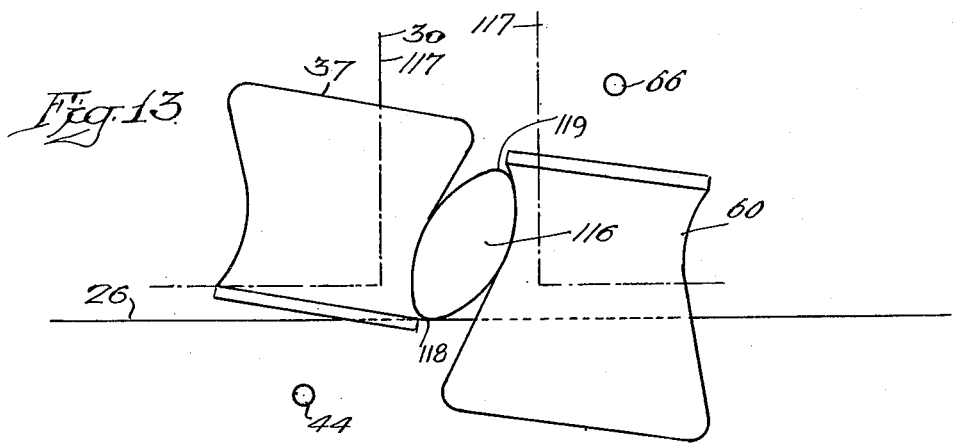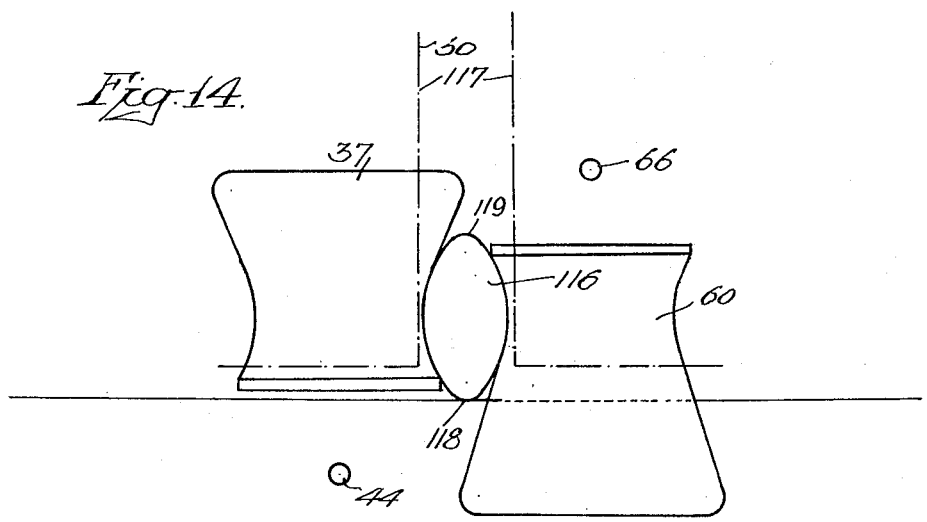

Aug. 18, 1953  E. C. PETERSON  2,649,003
MANIPULATING ON MILL TABLES
Filed May 28, 1947  9 Sheets-Sheet 9
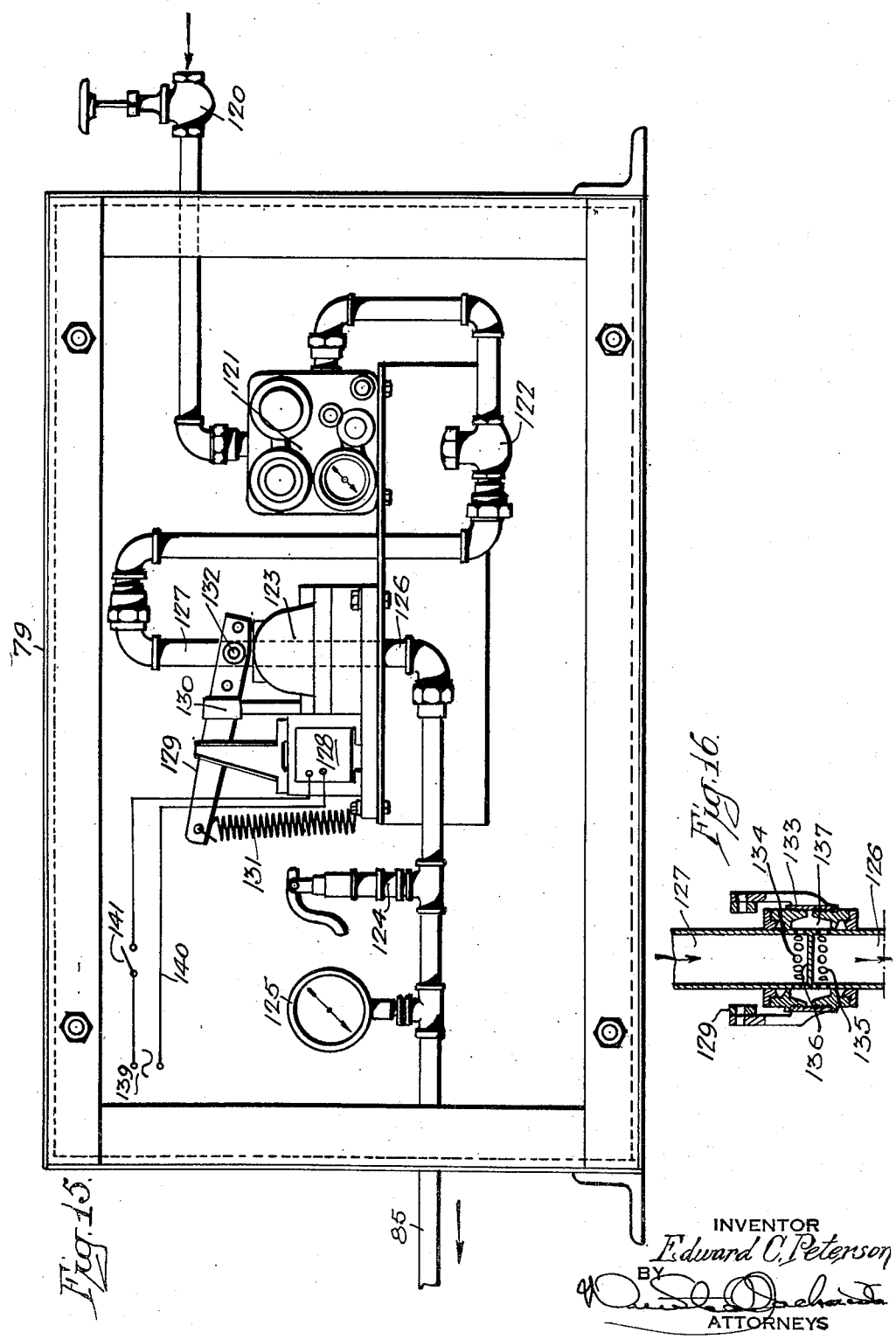
INVENTOR
Edward C. Peterson
BY
ATTORNEYS Patented Aug. 18, 1953

2,649,003

UNITED STATES PATENT OFFICE 2,649,003

MANIPULATING ON MILL TABLES

Edward C. Peterson, Reading, Pa., assignor to Birdsboro Steel Foundry and Machine Company, Birdsboro, Pa., a corporation of Pennsylvania Application May 28, 1947, Serial No. 750,995

5 Claims. (Cl. 80—49)

My invention relates to manipulators for turning stock on a mill table in connection with a rolling mill and to processes of manipulating.

A purpose of my invention is to reduce the danger of marring, twisting or otherwise damaging billets and the like at hot working temperatures incident to the operation of turning or manipulating the billets about their axes preparatory to the next pass on the rolls.

A further purpose is to avoid the loss of time which has in some cases been incident to comparatively clumsy and ineffective manipulation of billets preparatory to further rolling or to further transfer.

A further purpose is to accomplish manipulation by heads or manipulator rollers preferably of concave conical shape, mounted at axes inclined to the horizontal, one predominantly above and the other predominantly below the billet on opposite sides thereof, and to manipulate the heads or manipulator rollers preferably through pistons acting on pivoted arms mounting the heads or rotatably mounting the rollers, and preferably with suitable spring retraction of the heads or manipulator rollers.

A further purpose is to pivot the arms for the heads or rollers on the laterally moving opposite guards of a main manipulator, the pivot for the upper roller being below that roller and the pivot for the lower roller being above that roller.

A further purpose is to apply the leverage from the piston on a bellcrank extension from the lower roller arm and on the end of the upper roller arm.

A further purpose is to avoid the necessity of hand turning of a billet of small cross section.

A further purpose is to permit rolling smaller rectangular cross sections on reversible blooming mills.

A further purpose is to urge the manipulator heads against the work by air pressure in cylinders individual to each head, to control the entering pressure in each cylinder individually for the particular head, to check escape of air from the cylinder to the air line, to compress the air in the cylinder as the stock is turned, to limit the pressure reached in each cylinder to a predetermined level and then to open each cylinder to exhaust.

A further purpose is to limit the air pressure in each cylinder urging a manipulator head forward to a predetermined value less than that required to equal the force exerted by the side guards, so that the side guards will cause shifting of the angular positions of the manipulator heads as the stock turns.

Further purposes appear in the specification and in the claims.

In the drawings I have chosen to illustrate one only of the numerous embodiments in which my invention may appear, choosing the form shown primarily from the standpoint of convenience in illustration, satisfactory operation and clear demonstration of the principles involved.

Figure 1 is a partially diagrammatic end elevation of a mill table and manipulator, omitting the table rollers which interfere with showing of the manipulator, and corresponding in position to a section on the line 1—1 of Figure 2.

Figure 2 is a fragmentary partially diagrammatic top plan view of the structure of Figure 1.

Figure 3 is an enlarged fragmentary top plan view of the mechanism for manipulating the lower head or manipulator roller, corresponding to structure illustrated at the right in Figures 1 and 2.

Figure 4 is a vertical section of the structure shown in Figure 3, the section being taken on the line 4—4 of Figure 5.

Figure 5 is a side elevation of the structure of Figures 3 and 4, partially in section along the line 5—5 of Figure 4.

Figure 6 is a fragmentary enlarged top plan view of the mechanism for operating the upper head or manipulator roll, as shown at the left of Figures 1 and 2.

Figure 7 is a vertical section of the mechanism of Figure 6, corresponding in position to the line 7—7 of Figure 8.

Figure 8 is a side elevation of the mechanism of Figures 6 and 7, corresponding to a left end view of Figure 7.

Figure 9 is a fragmentary transverse section parallel to Figure 1, but taken at a different point along the table, showing one of the mechanisms for laterally moving one of the guards.

Figure 10 is a view corresponding to Figure 9 taken at a different position along the transfer table, showing one of the mechanisms for laterally moving the other guard.

Figures 11 to 14 inclusive are fragmentary diagrammatic position views showing the operation of the manipulator.

Figure 15 is a sectional side elevation of the valves and piping of one of the air control boxes 79 or 80.

Figure 16 is a diagrammatic section of the solenoid valve shown in Figure 15.

In the drawings like numerals refer to like parts throughout.

Describing in illustration but not in limitation and referring to the drawings:

In the operation of rolling mills, particularly of the blooming mill type, the bloom or other stock is handled on the front and rear tables by the movable side guards of a main manipulator. As required the bloom is turned about its axis by means of a finger lift carried on one of the side guards of this main manipulator. With the above mechanism it is not possible to turn the stock about its axis when it has been rolled to a smaller cross section than 4 x 4 inches and it is not possible to turn an oval at any time. The prior practice in turning sections below 4 x 4 inches has been to use hand turning.

In accordance with the present invention, it is possible to roll smaller square or rectangular sections on reversing blooming mills by rolling an oval, turning it up on the mill table, and entering it into a smaller square or rectangular pass. In its broadest application, the invention may apply to shapes other than ovals but it finds its best expression in the turning of ovals, and the disclosure is directed particularly to oval manipulation. It will be understood, however, that the invention may readily be adapted to manipulating stock of other shapes.

The present invention greatly facilitates and expedites manipulation incident to turning of the stock and reduces the danger of marring the stock.

While the stock at the time of manipulation will normally be in the form of a billet, it will be understood, of course, that the relation of length to cross section is not critical in the present invention except as determining whether the turning may be accomplished by one manipulator or by several manipulators working together at various points along the length of the stock. Accordingly, the term "billet" is rather generally used to describe the stock, although it will be understood that in a particular case or in the custom of a particular mill, the shape at the time of manipulation may be more aptly described as an ingot, slab, bar, or the like.

The present invention is particularly directed to the very difficult problem of manipulating oval shapes, but it will be understood that various aspects of the invention may be applied to cross sections of other character. The oval contour is particularly difficult to manipulate because it frequently does not present any pronounced corners or projections on which manipulation can be accomplished, and necessitates manipulation on the basis of the difference between the major and minor axes of the ellipse. It will be understood that suitable adjustment will be made in the manipulator heads where other shapes are to be turned.

Referring to Figures 1 and 2, I illustrate a rolling mill table 25 having a plurality of horizontal table rollers 26 mounted in bearings 27 from base structure 28 and driven by suitable motor drives 29. The mill table is provided at its opposite sides with the usual laterally moving guards 30 and 31 which are movable across the table as well known, and carry a main manipulator as later described. The guards are driven by any suitable mechanism 31', of which one form is later described. The guards perform the functions of laterally positioning the stock for the next pass, laterally straightening the stock, laterally confining it as it moves on the table, supporting the main manipulator, and in the present invention, they perform the additional function of supporting and pushing the manipulator of the present invention. The guards are supplemented by suitably fixed approach guides 32 to direct the path of the stock.

Manipulators 34 and 35 in accordance with the invention are mounted on the guards at a longitudinal position 36 between two table rollers 26. While only one such position is shown in Figure 2, it will be evident that any desired number may be employed and that all such manipulators at their various positions will conveniently be alike.

It will be evident that the manipulators of the present invention are supported on the side guards of the main (finger lift) manipulator, and that such side guards are regarded as being part of the mill table. It will of course be evident that if desired the manipulators of the present invention may be conveniently supported in any other manner. It thus is immaterial, from the standpoint of the present invention, whether the side guards support the finger lift manipulator, as shown in Figure 9, or merely support the manipulators of the present invention.

In the particular form shown, the manipulator 34 is the upper manipulator and the manipulator 35 is the lower manipulator, but it will be understood that the choice as to which is the upper and which is the lower is merely a matter of convenience.

The upper manipulator 34 for oval manipulation comprises a head 37 suitably in the form of a roller to permit the manipulator to hold the stock in the turned position while the mill is withdrawing the stock through the manipulator to complete the next pass of the rolls. The engaging face of the head 37 is suitably concave at 38, having relatively protruding ends 39 and a hollow or depressed center 40. While it is not necessary that the contour be mathematically exact, it is preferable in an oval manipulator to use a roller contour which is the frustrum of a cone having a concavely curved surface. For other stock cross sections other manipulator contours may be preferable. In other words, in the preferred form the surface at its ends corresponds to the frustrum of a normal cone, but the intermediate portion of the circumference is recessed with respect to the surface of a cone. The preferable arrangement is to employ the large diameter 41 at the relatively upper end and the small diameter 42 at the relatively lower end.

The head of roller 37 is mounted on an arm 43 which is fixedly pivoted at 44 on the structure of the guard 30 (except as the guard itself moves).

While in the broadest aspect the head may not be aptly described as a roller, it is definitely desirable to make the head rotatable as shown, and accordingly the roller 37 is rotatable with respect to the arm 43 on suitable antifriction bearings 45 and 46.

Beyond the roller with respect to the pivot 44 and suitably at the upper end of the arm 43, pivotal connection 47 is made to the end of piston and rod 48 by means of clevis 49. The piston operates in cylinder 50 containing compressed air or other suitable fluid medium admitted at 51. The cylinder 50 is pivoted intermediate its ends on trunnions 52 mounted in trunnion bearings 54 on the guard 30.

Between the end of the roller 37 and the pivot 47, the arm 43 is surrounded by a spring abutment 55, and the structure is suitably locked by a threaded retainer 56. The spring abutment carries a hook 57 which engages one end of a tension spring 58 acting from an adjustable abutment 59 on the guard 30.

The opposite cooperating head or roller 60, which is predominantly below the stock, is in the preferred form similar in contour to that of the upper head or roller, being concaved at 63, but the large diameter end 61 is conveniently at the bottom and the small diameter end 62 at the top.

The head or roller 60 is mounted on arm 64, and is preferably rotatable thereon due to anti-friction bearings 45 and 46 held by a suitable retainer 65. The arm 64 is pivoted at 66 on the guard 31, and carries a bellcrank extension 67 at right angles, whose end remote from the pivot 66 is pivotally connected at 68 to the clevis 69 on piston and piston rod combination 70 operating in cylinder 71 under the action of compressed air or other fluid medium admitted at 72. The cylinder is pivoted on trunnions 74 from trunnion bearings 75 on the guard 31.

On the bellcrank extension 67 remote from pivot 66 are mounted spring abutments 76 which engage the ends of tension springs 77 acting from opposite adjustable spring abutments 78 in the guards 31.

Connections of air or other fluid to the cylinders for operating the piston-piston rod combinations are suitably flexible as shown in Figures 1 and 2 to permit maintenance of suitable contact as the guards move laterally to the dot-and-dash positions shown in Figure 1. For this purpose, air control boxes 79 and 80 are provided, the box 79 being connected to the cylinder 50 by a flexible conduit 81 carried in clips 82 on arms 83 and 84. The detail for controlling the air through the air control boxes 79 and 80 may be varied to meet the particular conditions, but a very desirable embodiment is described later in referring to Figures 15 and 16. The arm 83 is pivotally connected at its opposite ends to the box 79 at 85 and to the arm 84 at 86. The arm 84 is pivotally connected to the guard 30 at 87. Likewise the box 80 is connected to the cylinder 71 by flexible conduit 88 extending along the arms 89 and 90 over clips 91. The arm 89 is pivotally mounted adjoining the box at 92 and is pivotally connected to the arm 90 at 93 and the arm 90 is pivotally mounted at 94 on extension 95 from the guard 31.

It will be understood that the mechanism for moving the guards laterally back and forth and the main manipulator, if any, thereon, is not in itself part of the present invention and any convenient mechanism for this purpose may be employed.

Figure 9 illustrates suitable mechanism for moving the right hand guard, the mechanism shown being one of a plurality of suitably identical devices positioned along the guard and interconnected by shaft 96.

The guard 31 is supported on an inner end of a carriage 97 moving horizontally between two table roller positions on rollers 98 supported in the frame 28. A hold-down roller 98' is located above the top of the carriage. Carried on the lower surface of the rear end of the carriage 97 is a rack 99 engaging a gear 100 on the shaft 96.

If desired, the guard may carry a main manipulator such as a finger lift 101 of well known character, pivotally connected at 102 to a bellcrank 103 fixedly pivoted on the guard at 104, and pivotally connected by the opposite bellcrank arm to a connecting rod 105 pivotally connected to crank 106 driven by a speed reducer 107 under the action of an electric motor 108. The finger lift 101 is conveniently used to lift one corner of a relatively large (about 4 x 4 inch) rectangular shape for turning such shape.

The mechanism for laterally moving the opposite guard 30 is of similar character, conveniently shown in Figure 10. A carriage 109 at a position between two table rollers is horizontally moved on rollers 110 supported in the frame 28. The carriage extends through a recess 111 in guard 31 and beyond guard 31 is downwardly urged by hold-down roller 112. On the under side of the carriage is carried a rack 113 which engages a gear 114 on a shaft 115 extending longitudinally and interconnecting a plurality of devices as shown in Figure 10.

In the preferred embodiment of the manipulator of the present invention the air control boxes 79 and 80 are constructed as shown in Figures 15 and 16. Air from any suitable compressor is admitted to each control box from a main supply through a shut-off valve 120 which connects to a pressure regulator, filter and lubricator unit 121, of any well known commercial type, which connects to a check valve 122, thence to a double acting solenoid valve 123, thence to an adjustable relief or blow-off valve 124 of any standard type, then to a gauge 125 and finally to the pipe 85 to the cylinder.

The solenoid valve 123, as shown in diagrammatic form in Figure 16, has a connection 126 to the cylinder and a connection 127 to the check valve 122. A solenoid 128 through its armature and link as well known operates a lever 129 pivoted at 130 against the action of a spring 131. The opposite end of the lever is pivotally and slottedly connected at 132 to the end of a sliding valve sleeve 133, which in the position shown in Figure 16 connects valve ports 134 in connection 127 with the ports 135 in connection 126, around partition 136. The flow passes through annular space 137 of the sleeve. In the opposite position the valve sleeve sealing portion 138 passes above ports 135, opening the cylinder to atmosphere. The solenoid is conveniently operated by a source of alternating current 139 applied to lines 140, and is controlled by a switch 141 suitably located in the operating pulpit of the mill.

In operation it will be evident that as the oval or other suitable stock 116 leaves the rolling mill rolls and travels on the mill table over the table rollers, the guards will normally be rather widely spaced. As the stock reaches its limit of travel on the mill table, the guards will normally be moved toward one another to laterally straighten the stock and to move it in line with the next pass. At this time the manipulator heads or rollers of the invention will be angularly shifted to a position behind the lines of the guards so that the heads or manipulator rollers do not contact the stock. When it is desired to turn the stock, the guards are moved far enough apart as shown in Figure 11, so that the side faces 117 of the guards do not directly contact the stock. By applying air to the cylinders, the arms are then swung to the angular relationship as shown, for example, in Figure 1 or 12, with the bottom roller in a position to be partially above the stock and the top roller in a position to be partially below the stock. The stock in this position, if an oval or similar shape, will normally be lying flatwise as shown in Figures 1 and 12.

With the air still applied to the cylinders, the guards are then moved toward one another and the manipulators contact the stock, one above and one below and angularly disposed, thus producing a diagonal force which has a vertical component downward on one end 118 of the stock and upward on another end 119 of the stock, tending to turn the stock as shown in Figure 13. Since the air pressure maintained will apply on the piston and piston head combinations a force less than the force exerted on the guards, the guards will move closer and closer together while the heads or manipulator rollers swing as shown in Figures 13 and 14. Thus eventually a position will be achieved as shown in Figure 14 in which the stock has been turned 90°, and is engaged on either side by the manipulator rollers, whichh are now substantially vertical. The guards are not quite touching the stock in this position, so that the stock can be picked up by the rolling mill rolls for the next pass wthout frictional drag from the guards. The stock can then be returned to the rolling mill for the next pass simply by rotating the transfer rollers of the transfer table, which will feed the stock through the manipulator rollers while the stock is held by such rollers.

The guards may cooperate with the manipulator rollers in supporting the stock especially if the pressure on the manipulator rollers is unbalanced and they push more on one side than on another and so the stock touches one guard. As soon as the rolling mill rolls take hold of the stock, the operator will release the air pressure on the manipulator rolls, and they will return to the inactive position behind the guards as shown in Figure 11 but with the guards positioned as in Figure 14.

It will thus be evident that the manipulator rollers resiliently press down on one corner of the cross section of the stock and resiliently press up on the other corner of the cross section of the stock and eventually erect the stock with its major axis vertical as shown in Figure 14, and clamp the stock in its erected position by the engagement of the manipulator rollers on the two sides of the stock (and the proximity of the guards for secondary support) which prevent the stock from falling to its flatwise position. Although the stock is thus held, it is not gripped so tightly as to interfere in any way with return to the rolling mill for the next pass of the rolls, and is held against tilting back while it is thus withdrawn from the manipulator rolls.

Referring to the Figures 15 and 16 for understanding of the air control, it will be seen that both the initial pressure in either cylinder may be regulated by adjusting the regulators 121, and the maximum or blow-off pressure in either cylinder may be set by adjusting the blow-off valves 124. Both of these pressures will usually be different in the two cylinders, because the load on the lower manipulator head is likely to be different from the load on the upper manipulator head. The regulated inlet pressure will be, of course, lower than the blow-off pressure, and will produce a force on the manipulator head which is not sufficient to overcome the force of the side guard. Thus, when the manipulator operates from pressure from the supply line, the pressure will first force the manipulator fully out at an angle as shown in Figure 1, and escape of air from the cylinder back into the supply line will be prevented by the check valve. As the side guards move forward and the manipulators swing about their axes, the pistons will move back into the cylinders, further compressing the air in the cylinders until predetermined pressures set on the relief valves are reached, at which point each relief valve will blow off. The pressures in the cylinders will not rise above these levels and this will prevent reaching a pressure in either cylinder so great that the manipulator head will not yield under the force exerted by the side guards.

When the oval stock has been erected upright and is supported by the rollers of the oval manipulator, the side guards will not quite touch it or at least will not grip it, and the table rollers will carry the oval back into the next pass of the mill. As soon as the oval is started in the next pass, the manipulator rollers will have performed their function, and the solenoid switch can be operated to connect the cylinders to atmosphere, thus allowing the springs to return the manipulator heads to their positions behind the side guards.

It will be evident that the adjustment of the regulators will take account of the different forces exerted. For example, the regulator on the cylinder for the lower head may conveniently in a particular instance apply a higher initial pressure to its cylinder than the regulator on the cylinder for the upper head, to allow for the fact that it exerts a greater lifting force. Likewise the relief valve pressures will suitably be different. For example, the relief valve pressure on the cylinder for the lower manipulator may be greater than that on the cylinder for the upper manipulator head, to allow for greater force required to hold the stock in the upright position. Depending upon the conditions involved with the particular manipulator and the particular stock, the respective regulator pressures and relief valve pressures may both be higher in the case of one head and lower in the case of the other head, or the regulator valve pressure may be higher and the relief valve pressure lower in case of a particular head.

It will be evident that the manipulator of the present invention may be employed in connection with any suitable type of mill or mills and regardless of the type of mill or the presence or absence of other manipulation facilities.

In view of my invention and disclosure variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. In a manipulator for metallic stock, a pair of opposed side guards, means for moving the side guards horizontally toward and away from one another, a pivot on each side guard fixed with respect to that side guard and having a horizontal axis transverse to the direction of motion of the side guards, one of the pivots being relatively upper and the other relatively lower, an arm fixedly pivoted on each of the pivots, the arm pivoted on the upper pivot extending downwardly therefrom and the arm pivoted on the lower pivot extending upwardly therefrom, a manipulator roller having a concave surface journalled on the downwardly extending arm below its pivot and on an axis extending lengthwise of its arm, a cooperating manipulator roller having a concave surface journalled on the upwardly extending arm above its pivot and on an axis extending lengthwise of its arm, resilient means for urging the downwardly extending arm about its pivot, in a direction to move its roller up to a position inclined to the horizontal and resilient means urging the upwardly extending arm about its pivot in a direction to move its roller down to a position inclined to the horizontal in cooperating relation with the other roller.

2. A manipulator according to claim 1, in which the resilient means comprise fluid cylinders mounted on the side guards and movable therewith and pistons in the cylinders operatively connected to the arms.

3. A manipulator according to claim 2, in combination with spring means for retracting the manipulator roller arms to positions behind the side guards.

4. A manipulator according to claim 1, in which the resilient means comprise pneumatic cylinders mounted on the side guards and movable therewith, pistons in the cylinders operatively connected to the arms, and relief valves in communication with the cylinders, whereby force exerted on the side guards toward one another can cause the pistons to yield and permit the side guards to move together without exerting increasing force.

5. In a manipulator for metallic stock, a pair of opposed side guards, means for moving the side guards horizontally toward and away from one another, a pivot on each side guard fixed with respect to that side guard and having a horizontal axis transverse to the direction of motion of the side guards, one of the pivots being relatively upper and the other relatively lower, an arm fixedly pivoted on each of the pivots, manipulator rollers journalled on the arms on axes extending lengthwise of the arms, one of the manipulator rollers having a diagonally upwardly directed surface of revolution and the other manipulator roller cooperating therewith and having a concavity one side of which forms a diagonally downwardly directed surface of revolution and the other side of which concavity forms a surface of revolution disposed at an angle to the first and resilient means resisting relative swinging of the manipulator roller arms and yielding to a position in which the manipulator rollers engage the sides of stock in erected position.

EDWARD C. PETERSON.

References Cited in the file of this patent

UNITED STATES PATENTS

| Number | Name | Date |
|---|---|---|
| 1,152,014 | Farkell | Aug. 31, 1915 |
| 1,903,887 | Widener | Apr. 18, 1933 |
| 2,271,213 | Weidner et al. | Jan. 27, 1942 |

FOREIGN PATENTS

| Number | Country | Date |
|---|---|---|
| 147,418 | Germany | Jan. 22, 1903 |
| 234,802 | Great Britain | May 16, 1925 |
| 487,863 | Germany | Dec. 13, 1929 |
| 489,446 | Germany | Jan. 17, 1930 |
| 547,999 | Great Britain | Sept. 21, 1942 |
| 614,389 | Germany | June 9, 1935 |